Nov. 14, 1967　　　C. A. ROBERTSON ETAL　　　3,353,013
PAVEMENT EMBEDDED LIGHTING UNIT
Filed Aug. 12, 1965　　　　　　　　　　　　　　2 Sheets-Sheet 1
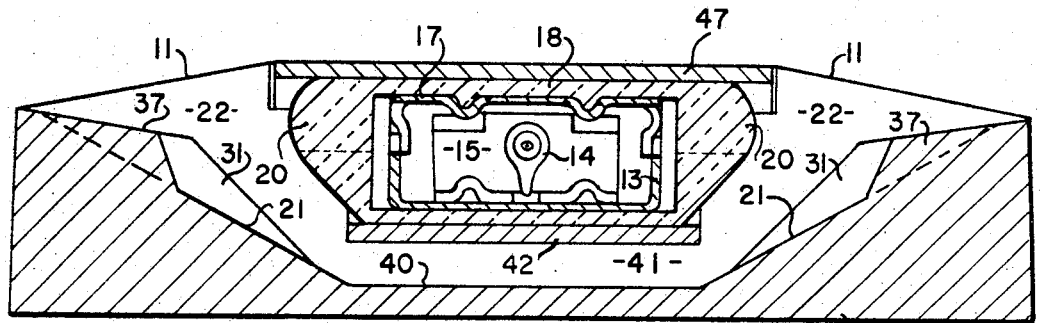
FIG. 2
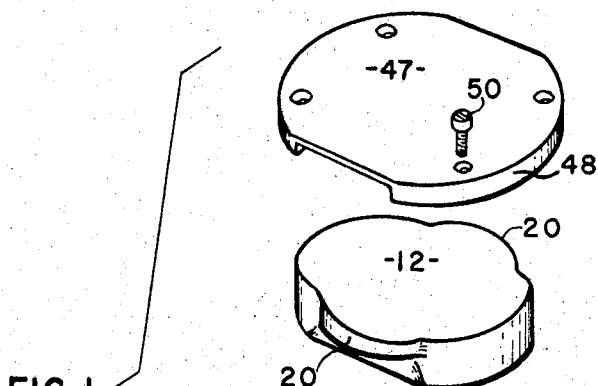
FIG. 1
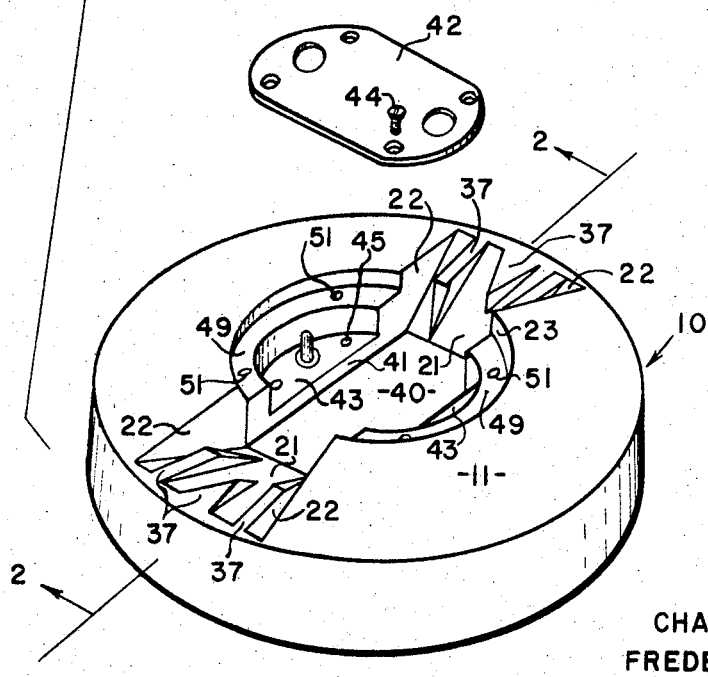
INVENTOR.
CHARLES A. ROBERTSON
FREDERICK B. SMALL
BY D. Emmett Thompson
ATTORNEY.

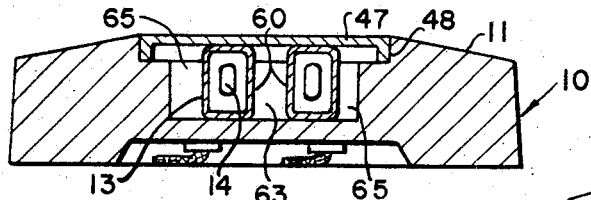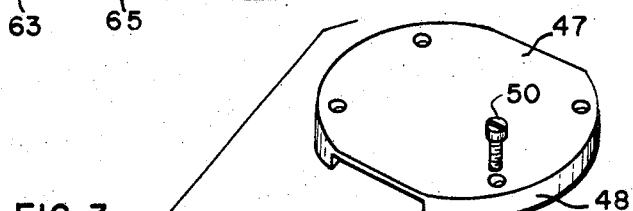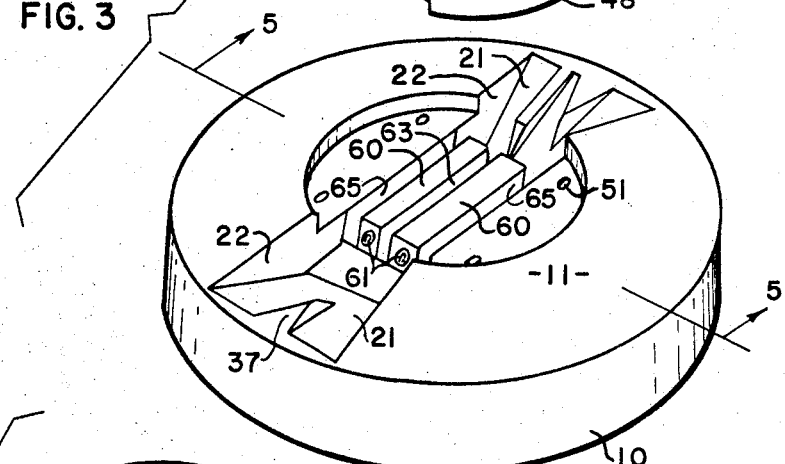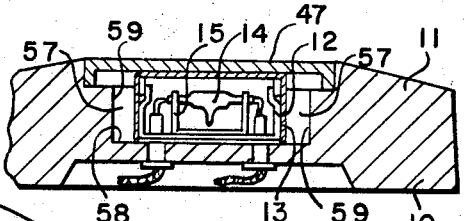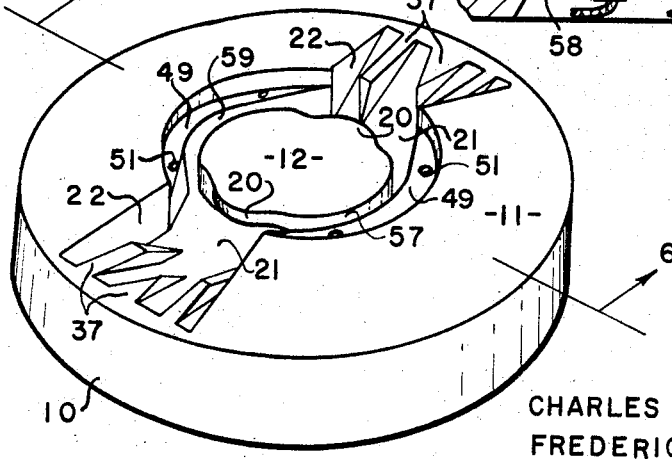

United States Patent Office 3,353,013
Patented Nov. 14, 1967

---

3,353,013
PAVEMENT EMBEDDED LIGHTING UNIT
Charles A. Robertson, Syracuse, and Frederick B. Small, Moravia, N.Y., assignors to Crouse-Hinds Company, Syracuse, N.Y., a corporation of New York
Filed Aug. 12, 1965, Ser. No. 479,149
2 Claims. (Cl. 240—1.2)

ABSTRACT OF THE DISCLOSURE

A light fixture for embedment in an airport runway and having a diametrically extending light passage channel, an encapsulated lamp unit mounted in the medial area of the channel in upwardly spaced relation to the bottom wall of the channel providing a through passage from one end of the light channel to the other.

---

This invention relates to light fixtures of the type adapted to be inserted or embedded in pavement surfaces at airports, such as landing strips, taxiways, runways, etc.

These fixtures are designated as semi-flush mounted, the top surface of the fixture projecting above the surface of the pavement only a fraction of an inch. The fixture is provided with a lamp unit and optical system for directing a light beam along the surface of the pavement, usually in opposite directions from the fixture lengthwise of the runway.

In order to obtain a sufficiently powerful light beam, it is necessary that a portion of the lens be located below the plane of the pavement surface. This, in turn, requires a depressed pocket, or concavity, in the fixture surface, with light beam passage channels extending radially therefrom. The open channels are free to fill up with water and slush, and become impacted with dirt or other debris. This results in damage to the lens, seals, or gaskets, or may even shut off the light beam.

When these channels are filled, even with water, the impact of an aircraft landing wheel tire on a fixture acts like a high pressure diaphragm pump transmitting shock loads to the fluid in the channel, and thereby directly to the lens and other parts of the fixture.

This invention has as an object a semi-flush mounted light fixture embodying a structural arrangement, which functions to reduce, or prevent, the accumulation of foreign material in the light directing channels of the unit, and to greatly reduce, or prevent, the build-up of high hydraulic pressure when an aircraft tire rolls over the fixture with the presence of material in the light directing channels.

The invention has as a further object a runway light, a fixture wherein the light passage channels embodying a construction which serves to prevent the landing wheel tire from flowing into the channel against the lens of the lamp unit.

The invention consists in the novel features and in the combinations and constructions hereinafter set forth and claimed.

In describing this invention, reference is made to the accompanying drawings in which like characters designate corresponding parts in all the views.

In the drawings:

FIGURE 1 is an exploded view of the light fixture embodying our invention.

FIGURE 2 is a sectional view taken on a line corresponding to line 2—2, FIGURE 1.

FIGURE 3 and 4 are isometric views in perspective of light fixtures illustrating modifications of our invention, together with the cover plates therefore.

FIGURE 5 is a sectional view taken on lines 5—5, FIGURE 3.

FIGURE 6 is a sectional view taken on lines 6—6, FIGURE 4.

The fixture consists of a body or base member 10, shown as being of circular form, although the peripheral configuration is not of importance. The top surface 11 of the base member is of truncated conical form. A lamp unit 12 is mounted in the central portion of the base. In FIGURES 1, 2, 4 and 6, the lamp unit 12 is an encapsulated unit, which consists generally of a metallic box 13, in which is mounted a high intensity larmp 14 by means of a U-shaped supporting member 15. The box is provided with a cover 17, and the box and cover assembly is encapsulated in plastic material 18. The lamp unit is formed or provided with a lens. Preferably, the encapsulated material 18 is of optical grade and is shaped to form a lens portion 20 at opposite sides of the unit. This type of encapsulated lamp unit is disclosed in our copending application, Ser. No. 469,141 filed July 2, 1965.

The base member 10 is formed with a light passage channel extending outwardly from each lens 20. This channel has a bottom wall 21 inclining downwardly from the periphery of the base toward the lens 20 and, preferably, the side walls 22 of these light passage channels diverge outwardly from the lens 20.

Preferably, there are one or more ribs 37 formed on the bottom walls 21 of the light passage channels. These ribs serve to lessen the likelihood of stones and the like, propelled along the pavement at high velocity by propeller backwash or the exhaust from jet engines, striking the lens 20, or accumulating in the light passage channels. These ribs also serve the important function of reducing the entry of the rubber tire on aircraft landing wheels, snowplows and the like, into the light passage channel and, accordingly, applying excessive pressure against the lens 20.

It will be apparent from the drawings that the light passage channels open through the top surface of the base. There is an extension channel communicating with the inner end of each light passage channel in proximity to the lens confronting the channel. This extension channel opens through the top surface of the base in an area remote from the lens. In the arrangements shown, due to the fact that there are two lens and two light passage channels extending generally diametrically of the base, there is one extension channel, common to the light passage channels—that is, the extension channel communicates with or connects the inner ends of the light passage channels.

In the arrangement shown in FIGURES 1 and 2, the extension channel is formed in the central portion of the base and is defined by a bottom wall 40, side walls 41 and a plate 42 on which the lamp unit 12 is positioned. The central area of the base member is recessed to provide a shoulder 43 of segmental form at each side of the extension channel. These shoulders are spaced upwardly from the bottom wall 40 by the height of the side wall 41.

The plate 42 is affixed to the shoulders 43 by screws 44 threading into apertures 45 formed in the shoulders 43. The encapsulated lamp unit 12 is maintained in position on the plate 42 by a cover member 47 formed with arcuate-shaped depending flanges 48 dimensioned complemental to the end portions of the lamp unit 12.

The top surface of the central portion of the base member is recessed to provide arcuate shoulders 49 on which the cover flanges 48 are positioned. The cover is attached to the base member by screws 50 threading into apertures 51 formed in the shoulders 49.

While the ribs 37 serve to limit the intrusion of a rubber tire into the light passage channels, if the channels are filled with water, the rubber tire does act as a diaphragm pump exerting very high pressure on the water in the fixture and, if the water were retained in the light passage channels, excessive pressure would be applied against the lenses 20. However, with the extension channel, the water is free to flow from one light passage channel through the extension channel to the other light passage channel and then out of the fixture, thus preventing the build-up of any excessive hydraulic pressure in the fixture and particularly against the lenses 20.

In the arrangement shown in FIGURES 4 and 6, the extension channel is indicated at 57, and extends around each side of the lamp unit 12, rather than underneath the lamp unit as in FIGURES 1 and 2. The channel 57 is defined by the bottom wall 58 on which the lamp unit 12 is mounted, side walls 59 and the cover plate 47.

In the arrangement shown in FIGURES 3 and 5, there are two lamp units 60, each of which is provided with a lens 61 in each end of the units. The units 60 are mounted in the central portion of the base and extend in spaced apart parallel relation providing a channel 63 between the units 60. There is also a channel passage 65 extending along the outer side of each of the units 60, the channels 63, 65 extending in a direction diametrically of the base, and these channels communicating at their ends with the inner ends of the light passage channels.

From the foregoing, it will be apparent that the extension channels provide for the escape of fluid from each light passage channel, and the rib structure 37 prevents an excessive amount of tire rubber from entering the light passage channels when a tire rolls over the fixture. These extension channels also aid in providing for the expulsion of dust and the like by propeller backwash and jet exhaust to avoid undue accumulations of foreign material in the fixture, and they also serve to dissipate heat from the light unit.

What we claim is:

1. A light fixture adapted for semi-flush mounting in an airport pavement comprising a base member formed with a channel open through the top surface of the base and extending transversely thereof, the medial portion of said channel having an intermediate bottom wall extending horizontally, the outer end portions of said channel having bottom walls inclining downwardly from the periphery of said base and merging with said intermediate bottom wall, shoulders formed in opposite side walls of said medial portion of said channel and being spaced upwardly from said intermediate bottom wall, a lamp unit mounted on said shoulders and spanning the space therebetween in upwardly spaced relation to said intermediate bottom wall, said lamp unit being operable to direct a light beam outwardly through said outer end portions of said channel, and a cover plate detachably secured to said base and overlying said lamp unit.

2. A light fixture for embedment in a pavement including a base member formed with a light passage channel opening through the top surface of the base and extending transversely thereof, said base being formed with a recess at the medial portion of said channel, a plate formed of rigid material extending transversely of said channel and being fixedly mounted in said recess in upwardly spaced relation to the bottom wall of the medial portion of said channel, an encapsulated light unit positioned on said plate and being formed with a lens in registration with said channel, a cover plate positioned on said encapsulated lamp unit, and means for detachably securing said cover plate to said base and clamping said lamp unit against said plate.

References Cited

UNITED STATES PATENTS

| 2,848,597 | 8/1958 | Knottnerus | 240—1.2 |
| 3,015,717 | 1/1962 | Angier | 240—1.2 |
| 3,200,243 | 8/1965 | McDevitt et al. | 240—1.2 |
| 3,250,906 | 5/1966 | Loch | 240—1.2 |

FOREIGN PATENTS

| 1,392,065 | 2/1965 | France. |
| 1,022,913 | 3/1966 | Great Britain. |

NORTON ANSHER, *Primary Examiner.*

DAVID L. JACOBSON, *Assistant Examiner.*